United States Patent

Adams et al.

[15] 3,639,746
[45] Feb. 1, 1972

[54] SEGMENTED LIGHT TABLE

[72] Inventors: Thomas F. Adams, Encino; Lyle T. Mattes, Torrance; Poul B. Roulund, Redondo Beach, all of Calif.

[73] Assignee: FMA, Inc., Los Angeles, Calif.

[22] Filed: May 5, 1969

[21] Appl. No.: 821,914

[52] U.S. Cl. .................................... 240/2 R, 40/106.1
[51] Int. Cl. ....................................... F21v 33/00
[58] Field of Search ............... 240/2 AT, 2 D; 352/123; 307/112; 353/21; 355/80; 40/106.1

[56] References Cited

UNITED STATES PATENTS

| | | | |
|---|---|---|---|
| 3,402,491 | 9/1968 | Wagner | 40/106.1 |
| 3,201,883 | 8/1965 | Schleisner-Meyer | 40/106.1 |
| 3,479,119 | 11/1969 | Miller et al. | 355/80 |
| 2,357,541 | 9/1944 | Pfeil | 240/2 X |
| 2,794,081 | 5/1957 | Luhn | 307/112 X |
| 2,701,838 | 2/1955 | Loesch | 240/2 D |
| 1,348,957 | 8/1920 | Pope | 240/2 AT |
| 2,567,561 | 9/1951 | Hoffmann | 240/2 AT |

Primary Examiner—Samuel S. Matthews
Assistant Examiner—Russell E. Adams, Jr.
Attorney—Christie, Parker & Hale

[57] ABSTRACT

An array of selectively energizable, elongated lamps that are arranged in parallel relationship. The lamps are disposed in individual compartments formed in a housing. Each compartment has a light reflective wall that opens toward a light diffusing plate covering one side of the housing. When a lamp is energized, it illuminates a segment of the plate that coincides in area with the opening of the corresponding compartment. One switch controls the energization of successive numbers of lamps from one edge of the array. Another switch controls the deenergization of any single lamp between the edges of the array.

10 Claims, 5 Drawing Figures

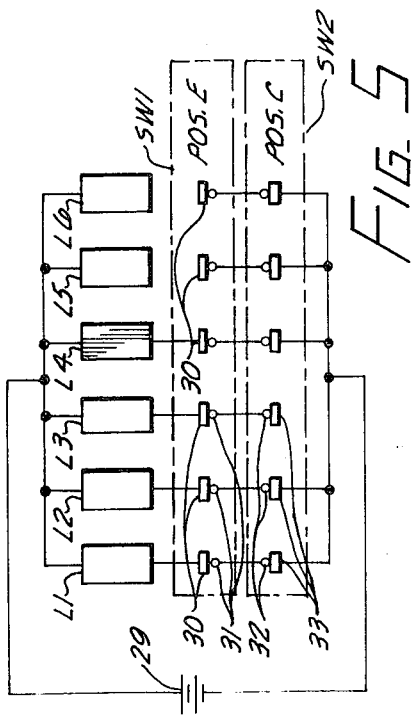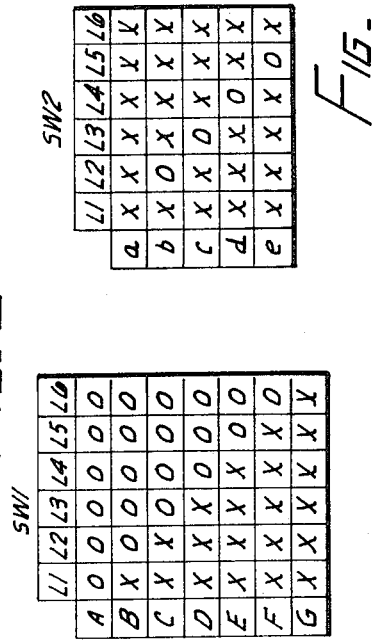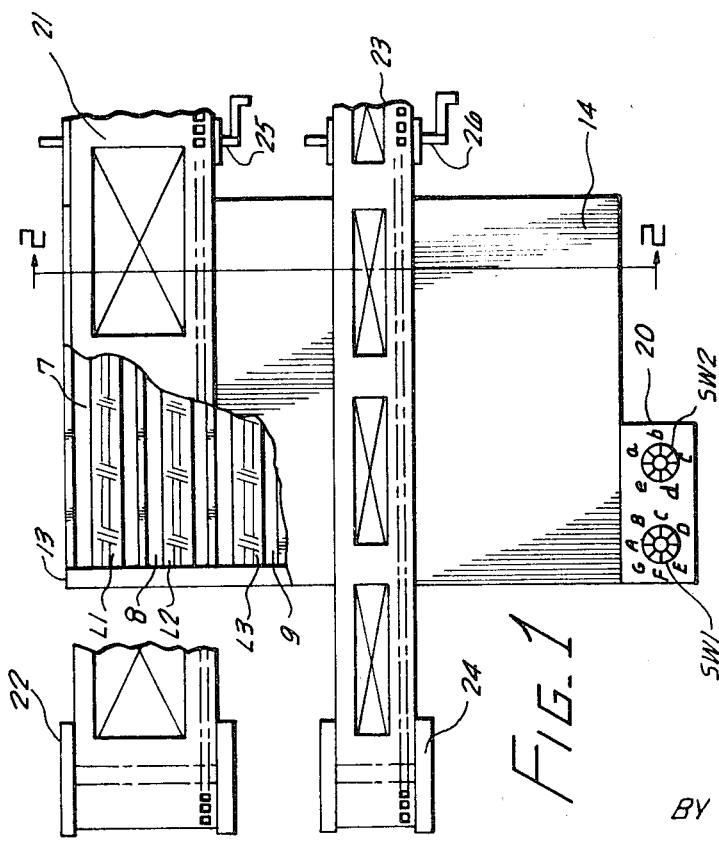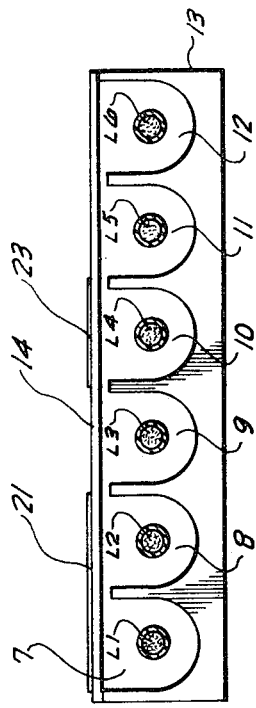

SEGMENTED LIGHT TABLE

BACKGROUND OF THE INVENTION

This invention relates to the display of photographic transparencies and, more particularly, to a light table having segments that can be selectively illuminated.

Photographic transparencies can be viewed with the aid of a light table. Conventionally, a light table consists of a lamp disposed in a housing that is covered by a light-diffusing plate. When the lamp is energized, it illuminates the plate, thereby permitting one to view photographic transparencies placed on the plate. It is distracting and aggravating to the viewer's eyes to illuminate portions of the plate not covered by the transparency while it is being displayed. Therefore, if a light table is intended to display transparencies having a uniform size, the light-diffusing plate is designed so it coincides in area with the transparency to be displayed. On the other hand, if a light table is intended to display transparencies having different sizes, mechanically operatable shutters or blinds are usually provided to block out light from the segments of the plate that are not covered by the transparency to be viewed. Such shutter arrangements are cumbersome and require substantial maintenance to keep them functioning. Further, the control of the shutters to illuminate selected segments of the light table is time consuming because consideration must be given to the placement of each and every shutter individually into the desired position.

SUMMARY OF THE INVENTION

The invention contemplates a segmented light table having an array of elongated selectively energizable lamps that are arranged in parallel relationship. The lamps are disposed in a housing. One side of the housing is covered by a light-diffusing plate. The interior of the housing and the lamps are arranged so one or more of the lamps when energized illuminates an area of the plate coinciding in width substantially with a strip of photographic transparencies to be viewed. Preferably, inside the housing there are formed compartments having light-reflective walls that open toward the plate. When the lamp disposed in a compartment is energized, it illuminates the segment of the plate that coincides in area with the opening of the corresponding compartment. Assuming the photographic transparencies to be displayed are adjacent to each other on elongated strips of film, the filmstrips are transported across the light table in a direction parallel to the length of the lamps. Further, the widths of the segments are designed so that width of each filmstrip coincides approximately with the width of one or more adjacent segments of the light table.

The selective energization of the lamps is controlled by two multiposition switches. In each position of the one switch, a different number of successive lamps from one edge of the array is energized. In each position of the other switch, a different single lamp between the edges of the array is deenergized. Thus, by positioning the first and second switches two elongated segments of the plate with various widths can be illuminated.

BRIEF DESCRIPTION OF THE DRAWING

The features of a specific embodiment of the best mode contemplated of carrying out the invention are illustrated in the drawing in which:

FIG. 1 is a top plan view of a light table and transport mechanisms for strips of film bearing photographic transparencies;

FIG. 2 is a side elevation view in section of the light table and film of FIG. 1;

FIGS. 3 and 4 are charts depicting the electrical connections between the lamps of the light table and the terminals of two rotary switches; and FIG. 5 is a circuit schematic diagram representing the connections between the lamps of the light table and the two switches in one position thereof.

DETAILED DESCRIPTION OF THE SPECIFIC EMBODIMENT

In FIGS. 1 and 2, a light table is shown having an array of elongated lamps, L1, L2, L3, L4, L5, and L6, arranged in parallel relationship. Lamps L1, L2, L3, L4, L5, and L6, are disposed respectively in compartments 7, 8, 9, 10, 11, and 12 that are formed in a housing 13. Compartments 7 through 12 have elongated, concave, light-reflective walls that open upward toward one side of housing 13. This side of housing 13 is covered by a light-diffusing plate 14 of conventional type. Lamp L1 through L6 are preferably low heat-producing lamps such as fluorescent lamps.

Elongated strips 21 and 23 of film bearing longitudinally adjacent photographic transparencies 27 and 28 are stretched across plate 14. Filmstrip 21 is stored on a reel 22 and moved across the surface of plate 14 in a direction parallel to the length of lamps L1 through L6 by a transport mechanism 25. Similarly, filmstrip 23 is stored on a reel 24 and moved across the surface of plate 14 in a direction parallel to the length of lamps L1 through L6 by a transport mechanism 26. Transport mechanisms 25 and 26 are represented schematically. In fact, they could include a number of conventional guide rollers and motor-driven sprocket wheels for moving the filmstrips across plate 14 to takeup reels. The means for supporting reels 22 and 24 are not shown in FIG. 1.

When one of lamps L1 through L6 is energized, it illuminates the segment of plate 14 that coincides in area with the opening of the compartment in which the energized lamp is disposed. The openings of one or more compartments preferably coincide in width to the filmstrips. This is illustrated in FIG. 2 where the openings of compartments 7 and 8 coincide substantially in width with filmstrip 21, and the opening of compartment 10 coincides substantially in width with filmstrip 23. As a result, when lamps L1, L2, and L4 are selectively energized, an area of plate 14 coinciding in area with strips 21 and 23 is illuminated and the remaining area of plate 14 stays dark. The curvature of the walls of compartments 7 through 12 and the position of lamps L1 through L6 in their respective compartments are selected so a sharp line of demarcation exists between adjacent illuminated and nonilluminated segments of plate 14 without producing a noticeable line between adjacent illuminated segments of plate 14.

The light table has a control panel 20 (FIG. 1) on which are mounted multiple-position rotary switches SW1 and SW2. The user of the light table selectively energizes lamps L1 through L6 by positioning switches SW1 and SW2. Switch SW1 has seven positions designated A, B, C, D, E, F, and G, and switch SW2 has five positions designated a, b, c, d, and e. Each switch has six stationary contacts for each position and six rotary contacts that make electrical contact with the respective stationary contacts for the position in which the switch is placed. One terminal of each lamp is connected to one terminal of an electrical energizing source. The other terminal of each lamp is selectively connected to the respective fixed terminals of the seven positions of switch SW1. The chart of FIG. 3 depicts the selective connections that are made between the lamps and the fixed contacts of switch SW1, an "O" indicating a lack of a connection and an "X" indicating the presence of a connection. The rotary contacts of switch SW1 are respectively connected to the rotary contacts of switch SW2. The fixed contacts of the five positions of switch SW2 are selectively connected to the other terminal of the energizing source. In the chart of FIG. 4, the selective connections between the fixed contacts of switch SW2 and the other terminal of the energizing source are depicted, an "O" representing the absence of a connection and an "X" representing the presence of a connection.

When the user of the light table places switch SW1 in its different positions, different numbers of successive lamps from one edge of the array are illuminated. When the user of the light table places switch SW2 in its different positions, a different single lamp between the edges of the array is deenergized.

FIG. 5 is a schematic circuit diagram showing the connections between the energizing source, the lamps, and the contacts of switches SW1 and SW2 when switch SW1 is in position E and when switch SW2 is in position c. These are the switch positions that illuminate the segments of plate 14 coinciding in area to filmstrips 21 and 23. A battery 29 is the energizing source; contacts 30 are the fixed contacts of position E of switch SW1; contacts 31 are the rotary contacts of switch SW1; contacts 32 are the rotary contacts of switch SW2; and contacts 33 are the fixed contacts of position c of switch SW2. One terminal of each of lamps L1 through L6 is connected to the positive terminal of battery 29. In accordance with the chart of FIG. 3, lamps L1, L2, L3, and L4 have connections to the respective contacts 30, and lamps L5 and L6 have no connections to their respective contacts 30. There is a connection between each rotary contact 31 and its respective rotary contact 32. In accordance with the chart of FIG. 4, fixed contacts 33 corresponding to lamps L1, L2, L4, L5, and L6 have connections to the negative terminal of battery 29, while no connection exists between contact 33 of corresponding to lamp L3 and the negative terminal of battery 29.

Although the light table shown in FIGS. 1 and 2 has a single array of elongated lamps, the principles of the invention are also applicable to light tables having several such arrays arranged side by side.

What is claimed is:

1. An image-viewing system comprising:
    an array of elongated selectively energizable lamps that are arranged in parallel relationship;
    a housing enclosing the array of lamps;
    a light-diffusing plate covering one side of the housing;
    an elongated strip of image transparencies;
    a transport mechanism for transporting the strip across the plate in a direction parallel to the length of the lamps; and
    the interior of the housing and the lamps being arranged so one or more of the lamps when energized illuminates an area of the plate coinciding in width substantially with the strip.

2. The image-viewing system of claim 1, in which the interior of the housing has light-reflective walls forming a plurality of elongated parallel compartments such that each lamp is disposed in one compartment, the walls of the compartments form openings adjacent to the plate, and one or more of the openings coincide in width substantially with the strip.

3. The image-viewing system of claim 2, in which the walls of the compartments are concavely curved.

4. The image-viewing system of claim 3, in which lamps are energized by first and second multiple-position switches, a different number of successive lamps from one edge of the array being energized in each position of the first switch and a different single lamp being deenergized in each position of the second switch.

5. A segmented light table comprising:
    a housing forming a plurality of elongated parallel compartments having light-reflective walls opening toward one side of the housing;
    a light-diffusing plate covering the one side of the housing;
    a plurality of elongated selectively energizable lamps one of which is disposed in each compartment to illuminate when energized the segment of the plate coinciding in area with the opening of the compartment; and
    a transport mechanism for transporting an elongated strip of image transparencies across the plate in a direction parallel to the length of the compartments, the transport mechanism being aligned with one or more of the compartments to transport a strip across an area of the plate coinciding with one or more of the segments illuminated by the lamps.

6. The light table of claim 5, in which the walls of the compartments are concave.

7. The light table of claim 6, in which first and second multiple-position switches are provided to select the lamps to be energized, different numbers of successive lamps from one edge of the plurality being energized in the different positions of the first switch and different single lamps between the edges of the plurality being deenergized in the different positions of the second switch.

8. The light table of claim 5, in which first and second multiple-position switches are provided to select the lamps to be energized, different numbers of successive lamps from one edge of the plurality being energized in the different positions of the first switch and different lamps between the edges of the plurality being deenergized in the different positions of the second switch.

9. The light table of claim 8, in which a single lamp is deenergized in each position of the second switch.

10. The light table of claim 9, additionally comprising an auxiliary transport mechanism for transporting an elongated strip of image transparencies across the plate in a direction parallel to the length of the compartments, the auxiliary transport mechanism being aligned with one or more of the compartments to transport a strip across an area of the plate coinciding with one or more of the segments illuminated by the lamps.

* * * * *